(12) United States Patent
Ash et al.

(10) Patent No.: US 10,007,600 B2
(45) Date of Patent: *Jun. 26, 2018

(54) NVS THRESHOLDING FOR EFFICIENT DATA MANAGEMENT

(71) Applicant: INTERNATIONAL BUSINESS MACHINES CORPORATION, Armonk, NY (US)

(72) Inventors: Kevin J. Ash, Tucson, AZ (US); Michael T. Benhase, Tucson, AZ (US); Lokesh M. Gupta, Tucson, AZ (US); Kenneth W. Todd, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/809,084

(22) Filed: Nov. 10, 2017

(65) Prior Publication Data
US 2018/0089075 A1    Mar. 29, 2018

Related U.S. Application Data

(63) Continuation of application No. 14/074,085, filed on Nov. 7, 2013, now Pat. No. 9,852,059, which is a (Continued)

(51) Int. Cl.
*G06F 12/02* (2006.01)
*G06F 12/08* (2016.01)
*G06F 12/0873* (2016.01)

(52) U.S. Cl.
CPC ...... *G06F 12/0238* (2013.01); *G06F 12/0873* (2013.01); *G06F 2212/222* (2013.01)

(58) Field of Classification Search
None
See application file for complete search history.

(56) References Cited

U.S. PATENT DOCUMENTS 7,627,714 B2    12/2009   Ash et al.
2004/0054851 A1   3/2004   Acton et al.
(Continued)

FOREIGN PATENT DOCUMENTS

CN    101131671 A    2/2008
WO    2010020992 A1   2/2010

OTHER PUBLICATIONS

Kuhl et al., "Component-Based Performance Modeling of a Storage Area Network," Proceedings of the 2005 Winter Simulation Conference, 2005 (10 pages).

*Primary Examiner* — Gary W. Cygiel
(74) *Attorney, Agent, or Firm* — Griffiths & Seaton PLLC

(57) ABSTRACT

For data management by a processor device in a computing storage environment, a threshold for an amount of Non Volatile Storage (NVS) space to be consumed by any particular logically contiguous storage space in the computing storage environment is established based on at least one of a Redundant Array of Independent Disks (RAID) type, a number of point-in-time copy source data segments in the logically contiguous storage space, and a storage classification. Establishing the threshold for the amount of NVS to be consumed based on the number of point-in-time copy source data segments in the logically contiguous storage space further includes considering resources needed to perform a Copy Source To Target (CST) operation required prior to the point-in-time copy source data segments being destaged.

6 Claims, 4 Drawing Sheets

Related U.S. Application Data continuation of application No. 13/629,814, filed on Sep. 28, 2012, now Pat. No. 9,852,058.

(56) References Cited

U.S. PATENT DOCUMENTS

| | | |
|---|---|---|
| 2006/0080510 A1 | 4/2006 | Benhase et al. |
| 2007/0088930 A1 | 4/2007 | Matsuda et al. |
| 2009/0228660 A1 | 9/2009 | Edwards et al. |
| 2010/0325356 A1 | 12/2010 | Ash et al. |
| 2011/0208933 A1 | 8/2011 | Moshe et al. |
| 2011/0238672 A1 | 9/2011 | Agarwala et al. |
| 2012/0124294 A1 | 5/2012 | Atkisson et al. |
| 2012/0151143 A1 | 6/2012 | Ash et al. |
| 2012/0151148 A1 | 6/2012 | Beardsley et al. |
| 2012/0198174 A1 | 8/2012 | Nellans et al. |

NVS THRESHOLDING FOR EFFICIENT DATA MANAGEMENT

CROSS REFERENCE TO RELATED APPLICATIONS

This Application is a Continuation of U.S. patent application Ser. No. 14/074,085, filed on Nov. 7, 2013, which is a Continuation of U.S. patent application Ser. No. 13/629,814, filed on Sep. 28, 2012.

FIELD OF THE INVENTION

The present invention relates in general computing systems, and more particularly to, systems and methods for increased data management efficiency in computing storage environments.

DESCRIPTION OF THE RELATED ART

In today's society, computer systems are commonplace. Computer systems may be found in the workplace, at home, or at school. Computer systems may include data storage systems, or disk storage systems, to process and store data. Contemporary computer storage systems are known to destage, and subsequently, demote storage tracks from cache to long-term storage devices so that there is sufficient room in the cache for data to be written.

SUMMARY OF THE INVENTION

Computing storage environments featuring Cached control units may threshold, or set limits, on an amount of Non Volatile Storage (NVS) space that ranks of storage are allowed to consume at any particular time. This presents a single rank failure, for example, from consuming all of NVS space, and allows for multiple rank failures before all of NVS is consumed by failed ranks.

Over the past several years, while the size of memory used in NVS storage, such as Dynamic Random-Access Memory (DRAM) has grown exponentially, the speed of long term storage devices (e.g., storage drives) has not kept pace. As such, if a particular rank is allowed, for example, a percentage threshold allocation of NVS, it may not be possible to destage all of this data to long-term storage devices during quiesce/resume storage operations. A need exists for a data management mechanism that takes these disparities and other characteristics into account to improve overall performance.

Accordingly, and in light of the foregoing, various embodiments for data management in a computing storage environment are provided. In one embodiment, by way of example only, a method comprises destaging modified data over a certain time period during a quiesce/resume operation of any particular logically contiguous storage space to an amount of Non Volatile Storage (NVS) space upon performing a code load operation by establishing a threshold for the amount of NVS space to be consumed by the any particular logically contiguous storage space in the computing storage environment based on a Redundant Array of Independent Disks (RAID) type, a number of point-in-time copy source data segments in the logically contiguous storage space, and a storage classification, where establishing the threshold for the amount of NVS to be consumed based on the number of point-in-time copy source data segments in the logically contiguous storage space further includes considering resources needed to perform a Copy Source To Target (CST) operation required prior to the point-in-time copy source data segments being destaged.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As mentioned previously, computing storage environments featuring Cached control units may threshold, or set limits, on an amount of Non Volatile Storage (NVS) space that ranks of storage are allowed to consume at any particular time. This presents a single rank failure, for example, from consuming all of NVS space, and allows for multiple rank failures before all of NVS is consumed by failed ranks.

Additional thresholding may be implemented as applied to so-called "Nearline" disk storage devices such that these devices may be recognized in the storage environment, and thresholded such that, for example, a percentage of the NVS space that may be consumed by such Nearline devices, is set. Nearline devices have the characteristic that when being overdriven, they slow down to cool, and can eventually stop if they become too hot.

In one computing storage environment, when so-called "Enterprise" and Nearline ranks both exist, the collection of Nearline ranks may be allowed to consume about 50 percent (50%) of NVS, while the Enterprise ranks are allowed to consume one-hundred percent (100%) of NVS.

With the increase in NVS size (in one computing environment, NVS is 16 GB in size), a rank can now take 4 GB (25%) of NVS space. On a Code load operation, a Quiesce/Resume operation needs to be performed. To Quiesce/Resume a cluster in one computing storage environment, all modified data needs to be destaged. 4 GB may be too much to destage on such a Quiesce/Resume operation, and may cause the Quiesce/Resume to fail.

Over the past several years, while the size of memory used in NVS storage, such as Dynamic Random-Access Memory (DRAM) has grown exponentially, the speed of long term storage devices (e.g., storage drives) has not kept pace. As such, if a particular rank is allowed, for example, a percentage threshold allocation of NVS, it may not be possible to destage all of this data to long-term storage devices during quiesce/resume storage operations. A need exists for a data management mechanism that takes these disparities and other characteristics into account to improve overall performance.

The mechanisms of the illustrated embodiments incorporate new thresholding factors in addition to a percentage threshold of storage allowed to consume NVS. These new thresholding factors are based, for example, on a Redundant Array of Independent Disks (RAID) type of rank, a number of point-in-time copy source tracks in the particular rank, and storage classification (e.g., drive type(s) of the rank).

By introducing the additional thresholding factors, the mechanisms of the present invention ensure that, for example, the disparity between drive speed of the long term storage and the size of the NVS is taken into account, thereby allowing the amount allocated from NVS to be adequately destaged to long term storage in a certain period of time, such as during the aforementioned Quiesce/Resume storage operations.

Figure 1:
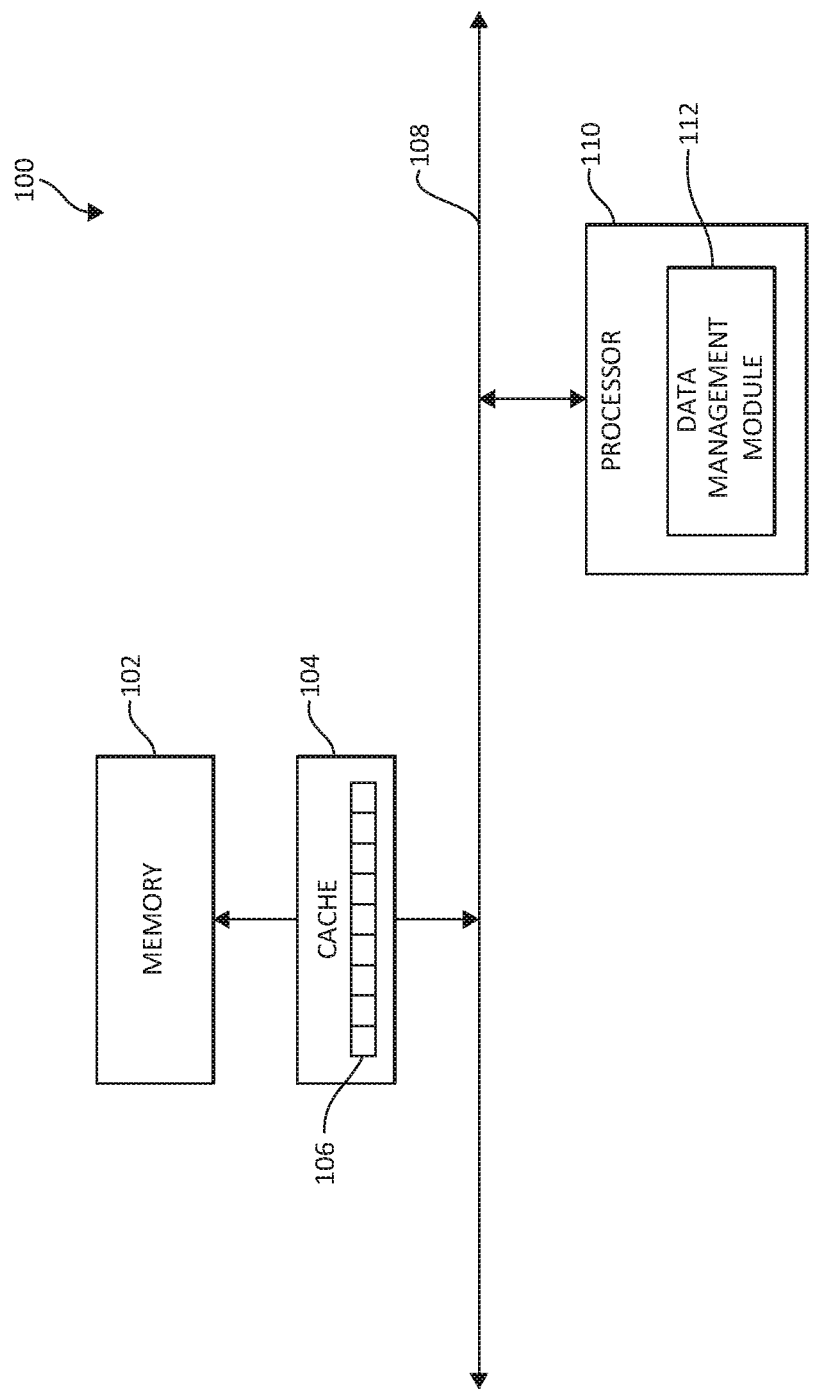
FIG. 1 is an exemplary block diagram showing a hardware structure for cache management in which aspects of the present invention may be realized.

Turning to FIG. 1, a block diagram of one embodiment of a system 100 for data management incorporating various aspects of the present invention is illustrated. At least in the illustrated embodiment, system 100 comprises a memory 102 coupled to a cache 104 and a processor 110 via a bus 108 (e.g., a wired and/or wireless bus).

Memory 102 may be any type of memory device known in the art. Examples of memory 102 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 102, storage tracks are capable of being stored in memory 102. Furthermore, each of the storage tracks can be staged or destaged from/to memory 102 from cache 104 when data is written to the storage tracks.

Cache 104, in one embodiment, comprises a write cache partitioned into one or more ranks 106, where each rank 106 includes one or more storage tracks. Cache 104 may be any cache known in the art.

During operation, the storage tracks in each rank 106 are destaged to memory 102 in a foreground destaging process after the storage tracks have been written to. That is, the foreground destage process destages storage tracks from the rank(s) 106 to memory 102 while a host (not shown) is actively writing to various storage tracks in the ranks 106 of cache 104. Ideally, a particular storage track is not being destaged when one or more hosts desire to write to the particular storage track, which is known as a destage conflict.

In various embodiments, processor 110 comprises or has access to a data management module 112, which comprises computer-readable code that, when executed by processor 110, causes processor 110 to perform data management operations in accordance with aspects of the illustrated embodiments. In the various embodiments, processor 110 establishes a threshold for an amount of Non Volatile Storage (NVS) space to be consumed by any particular logically contiguous storage space in the computing storage environment based on at least one of a Redundant Array of Independent Disks (RAID) type, a number of point-in-time copy source data segments in the logically contiguous storage space, and a storage classification.

In various other embodiments, processor 110 establishes an additional threshold for the amount of NVS space based on a predefined percentage assigned to the any particular logically contiguous storage space.

In various other embodiments, processor 110 establishes an NVS space limit for the any particular logically contiguous storage space as a minimum function of the threshold and the additional threshold.

In various other embodiments, processor 110 establishes an NVS space limit for the any particular logically contiguous storage space for a failback storage operation as a function of an Input/Output Operations per Second (IOPS) determination for the any particular logically contiguous storage space, a computed drain time, and a minimum NVS storage allocation.

In various other embodiments, processor 110 establishes an NVS space limit for the any particular logically contiguous storage space for a failback storage operation as a function of an Input/Output Operations per Second (IOPS) determination for the any particular logically contiguous storage space, a computed drain time, a minimum NVS storage allocation, and a total number of data segments in the NVS.

Figure 2:
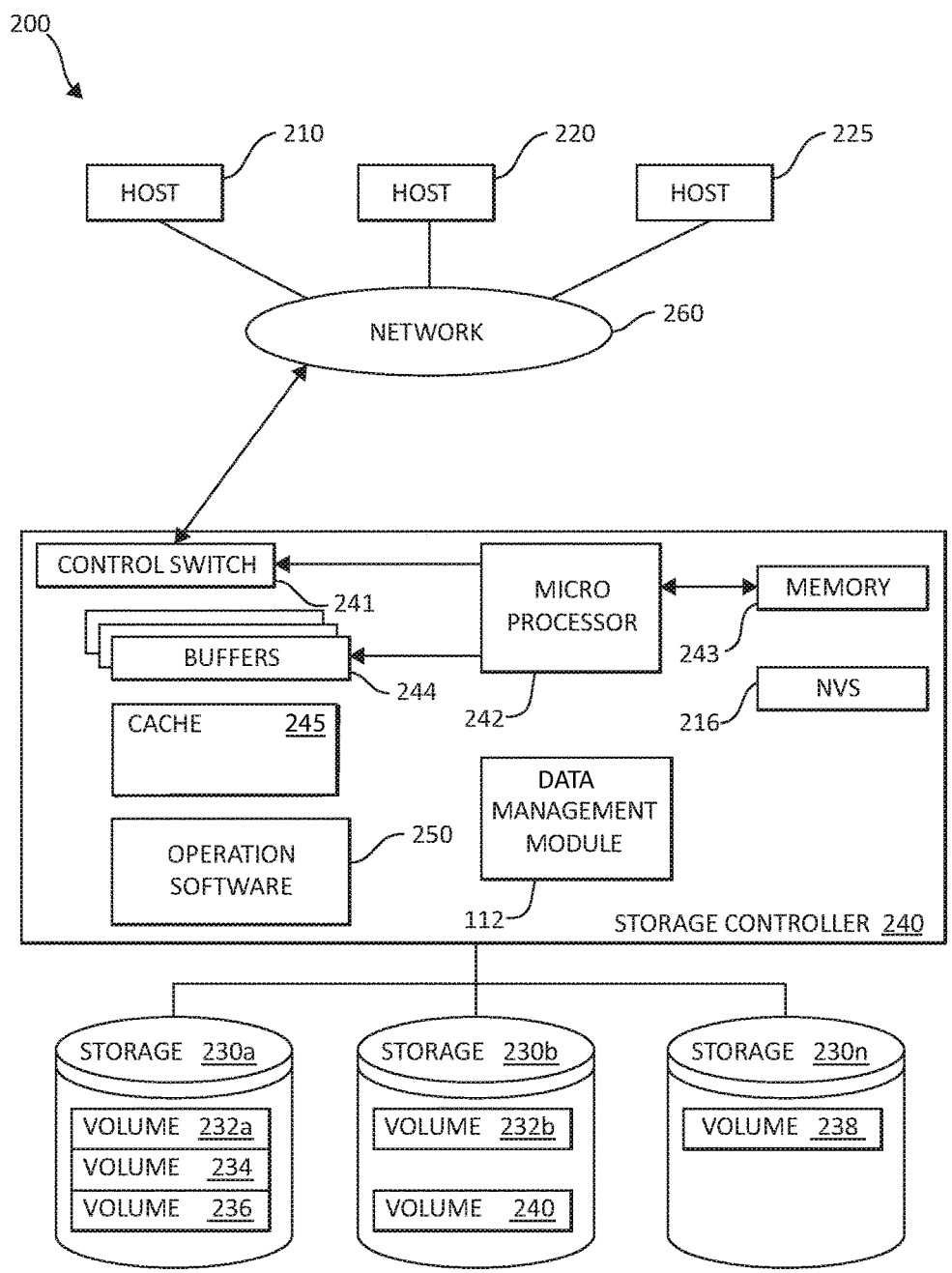
FIG. 2 is an exemplary block diagram showing a hardware structure of a data storage system in a computer system according to the present invention in which aspects of the present invention may be realized.

FIG. 2 is a block diagram 200 illustrating an exemplary hardware structure of a data storage system in which aspects of the present invention may be implemented. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

The storage controller 240 may include a data management module 112. The data management module 112 may incorporate internal memory (not shown) in which the destaging algorithm may store unprocessed, processed, or "semi-processed" data. The data management module 112 may work in conjunction with each and every component of the storage controller 240, the hosts 210, 220, 225, and other storage controllers 240 and hosts 210, 220, and 225 that may be remotely connected via the storage fabric 260. Data management module 112 may be structurally one complete module or may be associated and/or included with other individual modules. Data management module 112 may also be located in the cache 245 or other components of the storage controller 240. Data management module 112, along with microprocessor 242 may implement aspects of the illustrated embodiments, such as establishing threshold factors as will be further described.

The storage controller 240 includes a control switch 241 for controlling a protocol to control data transfer to or from the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, and the data management module 112, in which information may be set. The multiple buffers 244 may be implemented to assist with the methods and steps as described herein.

Figure 3:
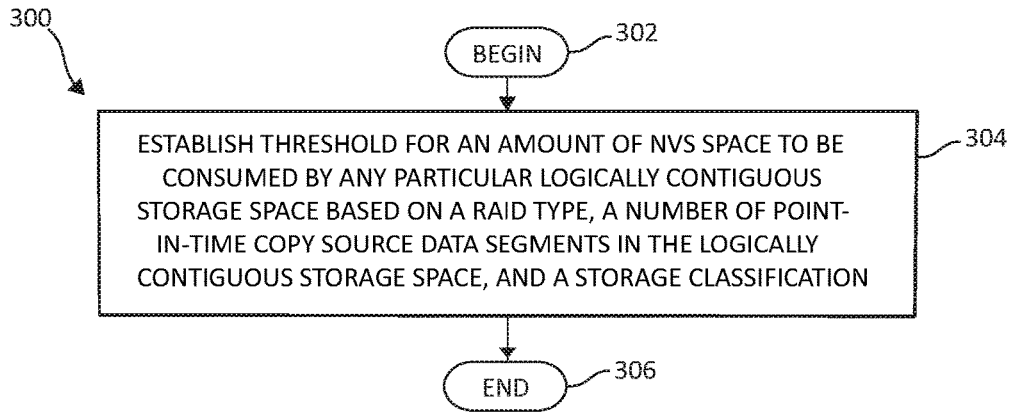
FIG. 3 is a flow chart diagram illustrating an exemplary method for increased efficiency in data management in a computing storage environment, again in which aspects of the present invention may be realized.

Turning now to FIG. 3, a flow chart diagram, illustrating a generalized method method 300 for data management, is depicted. Method 300 begins (step 302). One or more thresholds for an amount of NVS space to be consumed by any particular logically contiguous storage space are established. The thresholds may be based on a RAID type, a number of point-in-time-copy source data segments in the logically contiguous storage space, and a storage classification. The method 300 then ends (step 306).

Figure 4:
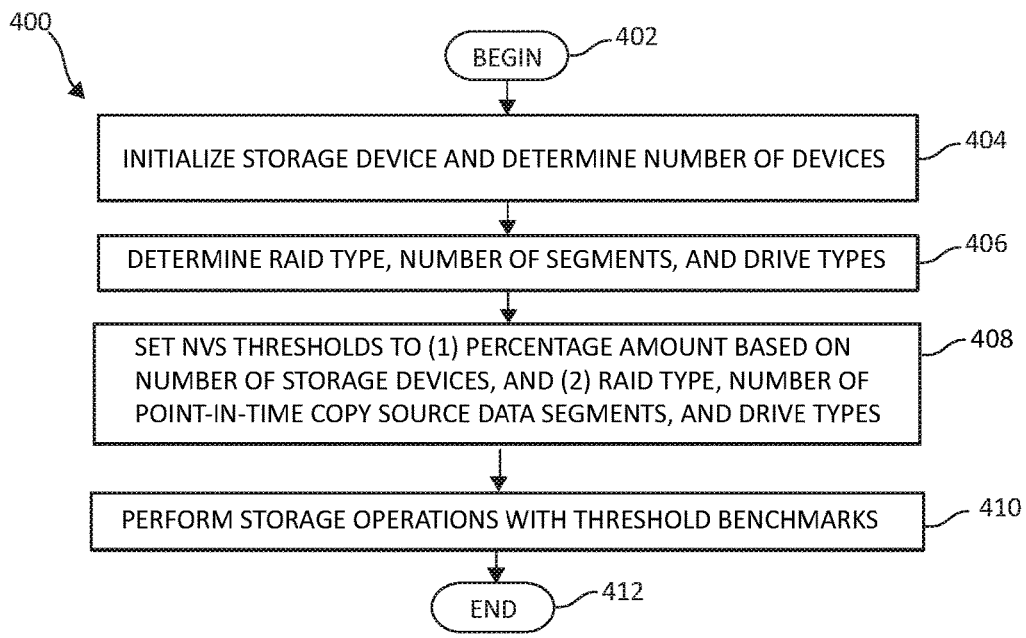
FIG. 4 is an additional flow chart diagram illustrating an exemplary method for performing various operations for data management enhancement, again in which aspects of the present invention may be implemented.

Turning now to FIG. 4, an additional flow chart diagram of exemplary operations in which aspects of the illustrated embodiments are incorporated, is depicted. Method 400 begins (step 402) with the initialization of one or more storage devices in the computing storage environment, and a determination of the number of applicable devices (step 404).

In a subsequent step, the method 400 determines applicable RAID types of individual ranks, numbers of applicable point-in-time copy source tracks in one or more of the individual ranks, and drive types of the one or more individual ranks (step 406). NVS threshold factors are then set to (1) a percentage amount based on the number of applicable storage devices, and (2) other factors such as the aforementioned RAID type, point-in-time copy source data segments, and drive types (step 408). Various storage operations are then performed with the threshold benchmarks as will be further described (step 410). The method 400 then ends (step 412).

In one embodiment, the threshold factoring may be configured as follows. Individual ranks may be configured with a new threshold in addition to the percentage basis of overall space (i.e., 25% of NVS). A "Rank NVS Limit" threshold may be defined as the minimum function of the percentage threshold (again, i.e., 25% of NVS), and a defined "Rank NVS Limit for NVS Failback" benchmark for individual ranks.

In an additional embodiment, the Rank NVS Limit for NVS Failback may be defined as a rank destage input/output per second (IOPS) metric, multiplied by a drain time, and multiplied by a minimum NVS allocation.

The Rank destage IOPS metric may, in one embodiment, be defined as a number of destage IOPS a particular rank can do. This metric is dependent on the rank type and the drive types that make up a rank. In one example, a RAID-5 Nearline rank may complete five hundred (500) IOPS. The aforementioned drain time may, in one embodiment, be represented as the time that a failback operation takes to drain NVS during a Quiesce/Resume operation. In one exemplary embodiment, the drain time is set to about ten (10) minutes or 600 s. Finally, the aforementioned minimum NVS allocation may be represented as the minimum unit of NVS allocation. In one storage environment, the minimum NVS allocation is 4K (Kilobytes).

With all of the foregoing in view, consider the following example. A particular storage environment may have an accompanying rank NVS limit for failback, with RAID-5 Nearline ranks, as (500 IOPS*600 s*4096K) as approximately equal to 1.2 GB.

An additional factor that may be used to determine the aforementioned rank NVS limit for failback is an amount of point-in-time copy source tracks in NVS. When a point-in-time copy source track is destaged, the track may require a Copy Source To Target (CST) operation before the source track can be destaged. A CST operation may consume a large amount of resources since the operation needs to stage data from the source, and then destage the data to the target.

To accommodate source point-in-time copy tracks, the aforementioned rank NVS limit for failback may be further defined as follows. The metric may be set equal to the aforementioned rank destage IOPS*drain time*minimum NVS allocation*the total tracks in NVS, divided by the total source point-in-time copy tracks in NVS*3+a total non-source point-in-copy racks in NVS. As one of ordinary skill in the art will appreciate, however, additional factors may be added or the aforementioned factors may be weighted to suit a particular application.

Figure 5:
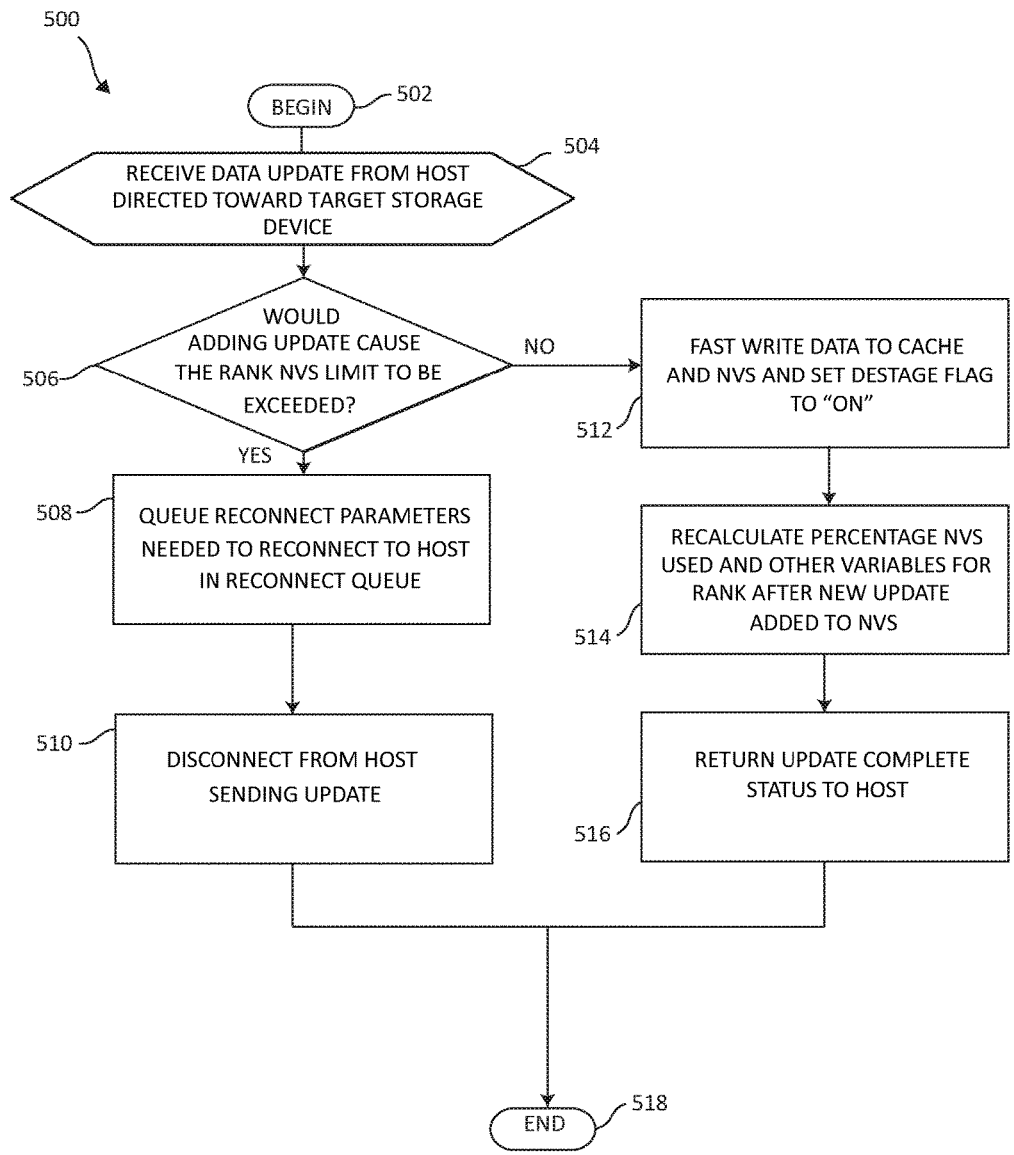
FIG. 5 is an additional flow chart diagram of exemplary logic performed when data is destaged from the NVS in accordance with implementations of the invention.

Turning now to FIG. 5, a flow chart diagram of exemplary fast write operation is depicted as method 500. Method 500 begins (step 502) with the receipt of data from host that is directed to a target storage device (step 504). In step 506, the method 500 queries whether adding the update would cause the rank NVS limit (as a function of the previous thresholds described) to be exceeded. If this is the case, then the method 500 queues reconnect parameters needed to reconnect the host providing the update in the reconnect queue (step 508) and disconnects from the host sending the update. The method 500 then ends (step 518). As a result, the storage controller will not accept updates that would cause the amount of NVS used for updates to the target storage device to exceed the previously described rank NVS limit.

Returning to step 506, if the rank NVS limit would not be exceeded by the update, then the method 500 fast writes the data to the cache and NVS, and sets the destage flag to "on." As a result of the update, the percentage of NVS used and other variables used in the thresholding previously described is recalculated (step 514), and an update complete status is returned to the host (step 516). The method 500 then ends (again, step 518). As one of ordinary skill in the art will appreciate, various logic may be implemented in similar fashion as that described in FIG. 5 to implement the thresholding techniques described by the illustrated embodiments.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A method for data management by a processor device in a computing storage environment, comprising:
    destaging modified data over a certain time period during a quiesce/resume operation of any particular logically contiguous storage space to an amount of Non Volatile Storage (NVS) space upon performing a code load operation by establishing a threshold for the amount of NVS space to be consumed by the any particular logically contiguous storage space in the computing storage environment based on a Redundant Array of Independent Disks (RAID) type, a number of point-in-time copy source data segments in the logically contiguous storage space, and a storage classification; wherein establishing the threshold for the amount of NVS to be consumed based on the number of point-in-time copy source data segments in the logically contiguous storage space further includes considering resources needed to perform a Copy Source To Target (CST) operation required prior to the point-in-time copy source data segments being destaged.

2. The method of claim 1, further including establishing an additional threshold for the amount of NVS space based on a predefined percentage assigned to the any particular logically contiguous storage space.

3. The method of claim 2, further including establishing an NVS space limit for the any particular logically contiguous storage space as a minimum function of the threshold and the additional threshold.

4. The method of claim 3, further including establishing an NVS space limit for the any particular logically contiguous storage space for a failback storage operation as a function of an Input/Output Operations per Second (IOPS) determination for the any particular logically contiguous storage space, a computed drain time, and a minimum NVS storage allocation.

5. The method of claim 3, further including establishing an NVS space limit for the any particular logically contiguous storage space for a failback storage operation as a function of an Input/Output Operations per Second (IOPS) determination for the any particular logically contiguous storage space, a computed drain time, a minimum NVS storage allocation, and a total number of data segments in the NVS.

6. The method of claim 1, wherein the any particular logically contiguous storage space is a storage rank, and the storage classification is a drive type in the storage rank.

* * * * *